US005233498A

United States Patent [19]

Kansala

[11] Patent Number: 5,233,498

[45] Date of Patent: Aug. 3, 1993

[54] ARRANGEMENT FOR FORCED TRIGGERING A SPARK GAP

[75] Inventor: Tarmo Kansala, Tampere, Finland

[73] Assignee: Nokia Capacitors Ltd., Helsinki, Finland

[21] Appl. No.: 679,006

[22] PCT Filed: Oct. 31, 1989

[86] PCT No.: PCT/FI89/00201

§ 371 Date: May 2, 1991

§ 102(e) Date: May 2, 1991

[87] PCT Pub. No.: WO90/05399

PCT Pub. Date: May 17, 1990

[30] Foreign Application Priority Data

Nov. 4, 1988 [FI] Finland ................................ 885099

[51] Int. Cl.⁵ ........................ H02H 1/04; H02H 9/06

[52] U.S. Cl. ...................................... 361/130; 361/58; 361/9

[58] Field of Search ............. 313/325; 315/36; 361/9, 361/10, 40, 58, 120, 129, 130

[56] References Cited

U.S. PATENT DOCUMENTS 3,611,044 5/1971 Osterhout .......................... 361/128
4,523,249 6/1985 Arimoto ............................... 361/58

*Primary Examiner*—A. D. Pellinen
*Assistant Examiner*—Michael A. Friedhofer
*Attorney, Agent, or Firm*—Finnegan, Henderson, Farabow, Garrett, and Dunner

[57] ABSTRACT

An arrangement for forced triggering a spark gap at a voltage below self-ignition voltage, which spark gap is divided into at least two sub spark gaps arranged in series, whereby voltage division components are connected in parallel with the sub spark gaps for effecting voltage division between the sub spark gaps. In order to obtain a forced triggering arrangement which is simple and reliable in operation, an element which is controlled to adopt a high-impedance or low-impedance state is arranged in series with the voltage division components, whereby the element, when adopting the high-impedance state, changes the voltage division between all the spark gaps so that one of the two series connected spark gaps arranged in parallel therewith is ignited.

2 Claims, 1 Drawing Sheet

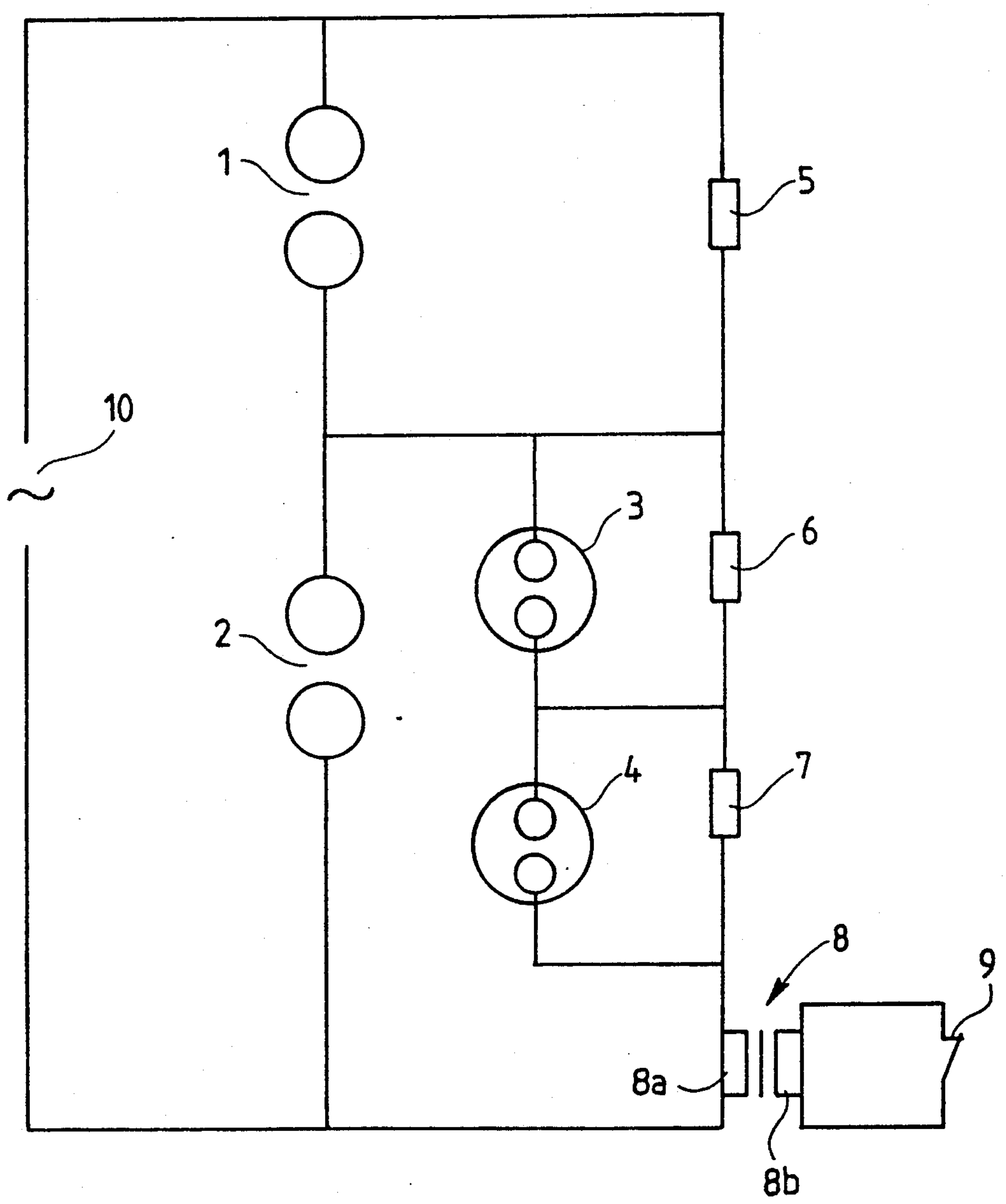
1
2
3
4
5
6
7
8
8a
8b
9
10

ARRANGEMENT FOR FORCED TRIGGERING A SPARK GAP

The invention relates to an arrangement for forced triggering a spark gap at a voltage below self-ignition voltage, the spark gap being divided into at least two sub spark gaps arranged in series, whereby voltage division components for dividing voltage between the or sub spark gaps are arranged in parallel with said series connected sub spark gaps.

Forced triggering is needed, for example, in spark gaps used in a series capacitor battery in a high-voltage transmission line. In these arrangements the spark gap protects a metal oxide varistor (MOV) connected in parallel with the battery against damages caused by possible overvoltages. The spark gap thereby functions as a kind of extremely rapid protective device which by-passes the capacitor battery and the varistor before the bypass circuit breaker itself starts to operate. The spark gap can be forced-triggered in response to a protective relay measuring the energy of the varistor. Arrangements of this type are disclosed, e.g., in SE Patent Application 8205236 and FI Patent Application 822379.

FI Patent Application 822379 discloses a device for forced triggering in which an auxiliary electrode is disposed in the spark gap, whereby the spark gap is ionized by means of a separate ignition transformer. It is thereby necessary to synchronize the auxiliary spark with the spark gap voltage because forced triggering cannot be carried out successfully if the instantaneous value of the spark gap voltage is too low. The use of this kind of auxiliary electrode increases scattering in self-ignition voltage level; on the other hand, there is a risk of the auxiliary electrode being damaged during the operation of the spark gap. If the auxiliary electrode is disposed in one of the auxiliary spark gaps arranged in parallel with the main spark gaps, forced triggering will not take place until relatively near the self-ignition voltage of the whole spark gap.

The method of SE Patent Application 8205236 similarly utilizes a separate pulse transformer which applies a high-voltage pulse for igniting the spark gap. In the device of the SE Patent Application, one of the auxiliary spark gaps arranged in parallel with the main spark gaps is ignited by means of a high-voltage pulse, whereby the auxiliary spark gaps are ignited, finally triggering the main spark gaps. In this device, too, the ignition pulse has to be synchronized with the spark gap voltage to enable forced triggering. This synchronization as well as the acquisition and supply of energy to the pulse transformer for the high-voltage pulse require suitable means. Such means make the device for forced triggering more complicated in structure, increase the cost as well as the liability of the device to damage, thus deteriorating the overall reliability of the device.

The object of the present invention is to provide a device for forced triggering which is very simple in structure and thus highly reliable in operation. This is achieved by means of an arrangement according to the invention, which is characterized in that an element controlled to adopt a high-impedance or low-impedance state is arranged in series with the voltage division components, whereby the element, when adopting the high-impedance state, changes the voltage division between the spark gaps so that the sub spark gap arranged in parallel therewith is ignited. So the operation of the arrangement of the invention is not based on the ignition of one of the auxiliary or sub spark gaps by means of a high-voltage pulse; instead, the arrangement of the invention affects the voltage division between the sub spark gaps so that a substantially greater proportion of the supplied energy than at normal state is caused to act across one of the spark gaps, causing it to be ignited The ignition of one of the sub spark gaps, in turn, results in the ignition o the spark gaps as their voltage increases substantially after the ignition of one spark gap.

The element, preferably controlled to adopt a low-impedance or high-impedance state, comprises a transformer having a primary winding arranged in series with the voltage division components and a secondary winding arranged to be substantially short-circuited and correspondingly substantially opened by means of a controllable switch. When the secondary winding of the transformer is at least substantially short-circuited, its primary side does not affect the voltage division between the spark gaps obtained by means of the voltage division components. Instead, when the secondary winding is opened at least substantially, the impedance of the primary side increases considerably so that a substantial proportion of the supply voltage of the spark gaps will act across it, causing the ignition of the spark gap connected in parallel with this particular primary winding.

In addition to its simple structure, a further advantage of the arrangement according to the invention is that it does not require synchronization with the spark gap voltage but the change of the impedance level of the device for forced triggering can be carried out at any moment.

In the following a specific spark gap arrangement with associated forced triggering arrangements will be described by way of example with reference to the attached drawing. In the FIGURE of the drawing, a main spark gap to which supply voltage 10 is applied is divided into two sub spark gaps 1 and 2 to which half of the whole spark gap voltage, for example, is applied. Furthermore, an auxiliary spark gap 3 and a precision spark gap 4 obtaining, e.g., one-fourth of the whole spark gap voltage are arranged in parallel with the sub spark gap 2. In order to divide voltage between these spark gaps, voltage division components 5, 6 and 7, typically high-voltage capacitors, are arranged in parallel therewith. In practice, the spark gaps 1–4 are in most cases adjustable, the adjustments being coordinated with respect to each other so that it is ensured that the precision spark gap 4 is always ignited first, whereby the voltage acting across the auxiliary spark gap 3 increases, causing it to be ignited. Thereby the voltage of the sub spark gap 1 increases, igniting it, and the whole spark gap voltage remains across the partial spark gap 2, causing this sub spark gap to be ignited, too.

The precision spark gap 4 may be gas-filled and its ionization may be stabilized by a radioactive preparation. In this way, its ignition voltage is not dependent on weather conditions, such as temperature, humidity, or air pressure. The auxiliary spark gap 3 is also typically gas-filled. The main spark gaps 1 and 2 typically comprise carbon electrodes. Generally speaking, the spark gap is divided into two or more parts mainly in order that the auxiliary spark gap initiating the proper discharge could be realized as a precision spark gap. This ensures that the main spark gap, too, will always operate very accurately at the same voltage.

The connection shown in the figure further comprises an arrangement according to the invention for forced triggering the spark gap. This arrangement comprises a transformer 8 having a primary winding 8*a*, typically a high-voltage winding, connected in series with the voltage-division components 5, 6 and 7 and in parallel with the sub spark gap 2. A secondary winding 8*b* of the transformer 8, normally a low-voltage winding, is short-circuited by means of a switching device 9. Thereby the impedance of the high-voltage side of the transformer 8 is so low that the voltage division of the spark gap will not be affected to any greater degree. If, however, the switching device 9 is opened, the impedance of the transformer 8 rises to a very high value. Thereby almost all of the spark gap voltage 10 is applied across the sub spark gap 2, which is ignited, that is, the spark gap is forced-triggered at a voltage level considerably below the self-ignition voltage. The switching device 9 may be e.g. a transistorized switch controlled through a photocable. If the arrangement of the figure forms part of a series capacitor battery, the control is effected by means of a relay observing the state of the metal oxide varistor connected in parallel with the series capacitor battery. The additional energy required by this kind of switching device 9 is low and the required electronics very simple. For increased reliability, several such switching devices can be connected in series.

The arrangement of the invention has been described above only by way of example by means of one specific embodiment. Accordingly, it is to be understood that the element according to the invention, which can adopt a high-impedance or low-impedance state, can be connected in parallel with any spark gap, in series with the component effecting the voltage division of this particular spark gap. The structure of this element may also differ from that described. In fact, the element can be any high-voltage switching device, such as a semiconductor type switching device, which is able to adopt a high-impedance or low-impedance state in a controlled manner. The functional principle and the basic idea of the invention thus are that this element enables the voltage division between the spark gaps to be affected to such an extent that the spark gap in parallel with which the element is connected is caused to be ignited also in cases where the spark gap voltage is considerably below the self-ignition voltage.

I claim:

1. A circuit for force triggering a spark gap at a voltage below a self-ignition voltage, comprising:

a voltage source;

at least two-series connected sub spark gaps connected across the voltage source;

a plurality of voltage division components;

a transformer having a primary winding and a secondary winding;

the primary winding and the plurality of voltage division components being connected to constitute a series circuit, the series circuit being connected across the voltage source:

a switching means connected across the secondary winding at times short circuiting the secondary winding for changing the impedance of the primary winding to adopt in the alternative one of a high impedance state and a low impedance state, said voltage division components being responsive to the high impedance state for igniting one of the at least two sub spark gaps.

2. The circuit of claim 1 further comprising a precision spark gap connected in series with an auxiliary spark gap, said precision and auxiliary spark gaps being connected in series with the primary winding and another of the at least two sub spark gasp.

* * * * *

UNITED STATES PATENT AND TRADEMARK OFFICE

CERTIFICATE OF CORRECTION

PATENT NO. : 5,233,498

DATED : August 3, 1993

INVENTOR(S) : TARMO KANSALA

It is certified that error appears in the above-indentified patent and that said Letters Patent is hereby corrected as shown below:

Claim 2, column 4, line 35, "gasp" should read --gaps--.

Signed and Sealed this

Thirty-first Day of May, 1994

Attest:

Bruce Lehman

BRUCE LEHMAN

Attesting Officer

Commissioner of Patents and Trademarks